(12) United States Patent
Bizub

(10) Patent No.: US 9,556,810 B2
(45) Date of Patent: Jan. 31, 2017

(54) SYSTEM AND METHOD FOR REGULATING EXHAUST GAS RECIRCULATION IN AN ENGINE

(71) Applicant: GENERAL ELECTRIC COMPANY, Schenectady, NY (US)

(72) Inventor: Jeffrey Jacob Bizub, Milwaukee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 112 days.

(21) Appl. No.: 14/587,407

(22) Filed: Dec. 31, 2014

(65) Prior Publication Data

US 2016/0186679 A1 Jun. 30, 2016

(51) Int. Cl.
| | |
|---|---|
| F02B 33/44 | (2006.01) |
| F02M 25/07 | (2006.01) |
| F02M 7/00 | (2006.01) |
| F02D 41/00 | (2006.01) |
| F02D 41/14 | (2006.01) |
| F02D 35/02 | (2006.01) |

(52) U.S. Cl.
CPC ......... *F02D 41/0052* (2013.01); *F02D 35/024* (2013.01); *F02D 35/027* (2013.01); *F02D 41/005* (2013.01); *F02D 41/0072* (2013.01); *F02D 41/1497* (2013.01); *F02M 25/0717* (2013.01); *F02M 25/0753* (2013.01); *F02M 25/0754* (2013.01)

(58) Field of Classification Search
CPC ............. F02D 41/0052; F02D 41/1497; F02M 25/0753; F02M 25/0754; F02M 26/04; F02M 26/07; F02M 26/41; F02M 26/48; F02M 2026/001; F02M 2026/004; F02M 2026/005; F02M 2026/008; F02M 2026/009

USPC .............. 60/605.2; 701/108, 101–104, 111; 123/406.11, 406.12, 406.23, 406.29, 123/406.41, 435, 305
See application file for complete search history.

(56) References Cited

U.S. PATENT DOCUMENTS

| 4,344,400 | A | * | 8/1982 | Asano | .................... F02D 41/10 123/435 |
| 4,762,109 | A | * | 8/1988 | Jeenicke | ............ F02D 41/0072 123/478 |

(Continued)

FOREIGN PATENT DOCUMENTS

| CN | 203480037 | | 3/2014 | | |
| DE | WO 8604645 A1 | * | 8/1986 | ......... | F02D 41/0072 |

(Continued)

OTHER PUBLICATIONS

European Search Report and Opinion issued in connection with corresponding EP Application No. 15201874.3 on May 20, 2016.

(Continued)

*Primary Examiner* — Thai Ba Trieu
(74) *Attorney, Agent, or Firm* — Fletcher Yoder, P.C.

(57) ABSTRACT

The present disclosure includes a system and method for regulating exhaust gas recirculation ("EGR") in an engine. In one embodiment, the system may include a knock sensor coupled to the engine that sends a signal corresponding to at least one operating condition of the engine to a controller. The controller may estimate an amount of EGR gas administered to the engine and regulate the amount of EGR gas being administered to the engine when the estimated amount of EGR gas is not an effective amount.

19 Claims, 7 Drawing Sheets

(56) References Cited

U.S. PATENT DOCUMENTS

| | | | |
|---|---|---|---|
| 4,777,920 A * | 10/1988 | Oshiage | F02P 5/152 |
| | | | 123/406.37 |
| 5,029,565 A | 7/1991 | Talbot | |
| 5,111,790 A | 5/1992 | Grandy | |
| 5,115,778 A | 5/1992 | Holroyd | |
| 5,119,783 A | 6/1992 | Komurasski | |
| 5,241,480 A | 8/1993 | Takaku et al. | |
| 5,257,533 A | 11/1993 | Imada | |
| 5,337,240 A | 8/1994 | Nakagawa et al. | |
| 5,339,245 A | 8/1994 | Hirata et al. | |
| 5,361,213 A | 11/1994 | Fujieda et al. | |
| 5,392,642 A | 2/1995 | Tao | |
| 5,400,648 A | 3/1995 | Mahr | |
| 5,452,699 A | 9/1995 | Rossignol | |
| 5,467,638 A | 11/1995 | Philipp | |
| 5,594,649 A | 1/1997 | Cook et al. | |
| 5,693,936 A | 12/1997 | Komachiya et al. | |
| 5,715,794 A * | 2/1998 | Nakamura | F02D 21/08 |
| | | | 123/305 |
| 5,738,074 A * | 4/1998 | Nakamura | F02D 35/023 |
| | | | 123/406.29 |
| 5,763,769 A | 6/1998 | Kluzner | |
| 5,778,857 A * | 7/1998 | Nakamura | F02D 35/023 |
| | | | 123/406.29 |
| 5,837,887 A | 11/1998 | Shibata et al. | |
| 5,905,193 A | 5/1999 | Hashizume et al. | |
| 5,932,801 A | 8/1999 | Akishita et al. | |
| 5,934,256 A | 8/1999 | Wenzlawski et al. | |
| 5,988,137 A * | 11/1999 | Tamura | F02D 41/0002 |
| | | | 123/295 |
| 5,996,398 A | 12/1999 | Schleupen et al. | |
| 6,104,195 A | 8/2000 | Yoshinaga et al. | |
| 6,273,064 B1 | 8/2001 | Scholl et al. | |
| 6,276,334 B1 | 8/2001 | Flynn et al. | |
| 6,330,877 B1 | 12/2001 | Nordin | |
| 6,336,355 B1 | 1/2002 | Sasaki et al. | |
| 6,354,268 B1 * | 3/2002 | Beck | F02D 19/027 |
| | | | 123/435 |
| 6,550,311 B2 | 4/2003 | Sloboda | |
| 6,553,949 B1 * | 4/2003 | Kolmanovsky | F02B 75/045 |
| | | | 123/406.21 |
| 6,598,468 B2 | 7/2003 | Zur Loye et al. | |
| 6,651,432 B1 * | 11/2003 | Gray, Jr. | F01N 3/035 |
| | | | 123/305 |
| 6,662,781 B1 | 12/2003 | Torno et al. | |
| 6,814,054 B2 | 11/2004 | Sauler et al. | |
| 6,827,061 B2 * | 12/2004 | Nytomt | F02D 35/023 |
| | | | 123/406.27 |
| 6,862,517 B2 | 3/2005 | Galtier | |
| 6,885,932 B2 | 4/2005 | Liu et al. | |
| 6,912,460 B2 | 6/2005 | Sauler et al. | |
| 6,928,361 B2 * | 8/2005 | Nakayama | F02D 41/1403 |
| | | | 701/104 |
| 6,947,829 B2 | 9/2005 | Honda | |
| 6,968,825 B2 * | 11/2005 | Hitomi | F01L 1/053 |
| | | | 123/406.11 |
| 6,978,771 B2 | 12/2005 | Kuzuyama et al. | |
| 6,990,947 B2 | 1/2006 | Kuzuyama et al. | |
| 7,021,128 B2 | 4/2006 | Rauchfuss et al. | |
| 7,027,909 B2 | 4/2006 | deBotton et al. | |
| 7,134,423 B2 * | 11/2006 | Zhu | F01N 3/2006 |
| | | | 123/406.14 |
| 7,159,568 B1 * | 1/2007 | Lewis | F02D 19/084 |
| | | | 123/299 |
| 7,181,338 B2 | 2/2007 | Takemura et al. | |
| 7,184,877 B1 * | 2/2007 | de Ojeda | F02D 35/028 |
| | | | 123/305 |
| 7,191,658 B2 | 3/2007 | Oda et al. | |
| 7,212,909 B2 | 5/2007 | Yoshino et al. | |
| 7,243,529 B2 | 7/2007 | Takemura et al. | |
| 7,246,600 B2 | 7/2007 | Nakashima et al. | |
| 7,260,469 B2 | 8/2007 | Birk et al. | |
| 7,263,872 B2 | 9/2007 | Danet et al. | |
| 7,310,993 B2 | 12/2007 | Popielas et al. | |
| 7,325,529 B2 | 2/2008 | Ancimer et al. | |
| 7,356,404 B2 | 4/2008 | Takemura et al. | |
| 7,376,506 B2 | 5/2008 | Schueler | |
| 7,383,816 B2 | 6/2008 | Zurlo | |
| 7,444,231 B2 | 10/2008 | Ancimer et al. | |
| 7,444,236 B2 | 10/2008 | Wiles | |
| 7,448,254 B2 | 11/2008 | Kurtz et al. | |
| 7,475,673 B1 * | 1/2009 | Fattic | F02D 21/08 |
| | | | 123/435 |
| 7,546,198 B2 | 6/2009 | Remelman | |
| 7,559,230 B2 | 7/2009 | Zimmer | |
| 7,571,640 B2 | 8/2009 | Andrews | |
| 7,628,253 B2 | 12/2009 | Jin et al. | |
| 7,669,582 B2 | 3/2010 | Kaneko et al. | |
| 7,712,450 B2 | 5/2010 | Sato et al. | |
| 7,747,380 B2 | 6/2010 | Chauvin et al. | |
| 7,810,469 B2 | 10/2010 | Vigild et al. | |
| 7,823,561 B2 | 11/2010 | Omuro et al. | |
| 7,996,147 B2 * | 8/2011 | Gokhale | F02D 35/023 |
| | | | 60/602 |
| 8,000,884 B2 | 8/2011 | Aso et al. | |
| 8,032,293 B2 | 10/2011 | Binder et al. | |
| 8,068,972 B2 | 11/2011 | Auclair et al. | |
| 8,078,389 B2 | 12/2011 | Huang et al. | |
| 8,079,261 B2 | 12/2011 | Crickmore et al. | |
| 8,103,428 B2 * | 1/2012 | Russ | F02D 35/027 |
| | | | 123/406.23 |
| 8,108,131 B2 | 1/2012 | Huang et al. | |
| 8,146,573 B2 * | 4/2012 | Oohashi | F02M 25/0751 |
| | | | 123/568.21 |
| 8,155,857 B2 | 4/2012 | Loeffler et al. | |
| 8,239,122 B2 * | 8/2012 | Leone | F02D 35/027 |
| | | | 123/406.29 |
| 8,250,905 B2 | 8/2012 | Schneider et al. | |
| 8,260,531 B2 | 9/2012 | Yasuda | |
| 8,316,824 B2 | 11/2012 | Hagari et al. | |
| 8,342,011 B2 | 1/2013 | Galtier et al. | |
| 8,352,163 B2 * | 1/2013 | Russ | F02M 25/0751 |
| | | | 123/406.23 |
| 8,359,909 B2 | 1/2013 | Duval et al. | |
| 8,396,649 B2 | 3/2013 | Huang | |
| 8,463,533 B2 | 6/2013 | Glugla et al. | |
| 8,499,623 B2 | 8/2013 | Duval et al. | |
| 8,528,521 B2 | 9/2013 | Landsmann et al. | |
| 8,538,666 B2 | 9/2013 | Buslepp et al. | |
| 8,606,484 B2 | 12/2013 | Ohata | |
| 8,627,800 B2 | 1/2014 | Glugla et al. | |
| 8,639,432 B2 | 1/2014 | Matsuo et al. | |
| 8,677,975 B2 | 3/2014 | AuClair et al. | |
| 8,680,707 B2 | 3/2014 | Childs et al. | |
| 8,812,310 B2 | 8/2014 | Muhammad et al. | |
| 8,849,471 B2 | 9/2014 | Daniel et al. | |
| 8,977,469 B2 * | 3/2015 | Gokhale | F02D 35/02 |
| | | | 123/575 |
| 8,997,698 B1 * | 4/2015 | Roth | F01P 3/08 |
| | | | 123/41.35 |
| 9,228,506 B2 * | 1/2016 | Gokhale | F02D 41/401 |
| | | | 701/102 |
| 2009/0249783 A1 * | 10/2009 | Gokhale | F02D 41/005 |
| | | | 60/602 |
| 2009/0299609 A1 * | 12/2009 | Gokhale | F02D 35/023 |
| | | | 701/105 |
| 2011/0288744 A1 * | 11/2011 | Gokhale | F02D 35/02 |
| | | | 701/102 |
| 2012/0290190 A1 * | 11/2012 | Kim | F02D 35/02 |
| | | | 701/102 |
| 2013/0192568 A1 * | 8/2013 | McNulty | F02B 47/08 |
| | | | 123/568.19 |
| 2015/0068506 A1 * | 3/2015 | Gokhale | F02D 19/0628 |
| | | | 123/679 |
| 2015/0176513 A1 * | 6/2015 | Lana | F02D 41/1439 |
| | | | 123/406.48 |

FOREIGN PATENT DOCUMENTS

| | | |
|---|---|---|
| DE | 19912895 A1 | 10/2000 |
| DE | 102005062280 A1 | 6/2007 |

(56) References Cited

FOREIGN PATENT DOCUMENTS

| | | |
|---|---|---|
| DE | 102006000973 A1 | 7/2007 |
| EP | 1447654 | 8/2004 |
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| JP | 2011149313 A * | 8/2011 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,412, filed Dec. 31, 2014, Jerry Jacob Bizub.
U.S. Appl. No. 14/587,434, filed Dec. 31, 2014, Jeffrey Jacob Bizub.
Reduction Piston Slap Excitation by Optimizing Piston Profiles; Takayuki Koizumi et al,; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.
Bolt loosening detection using vibration characteristics of thin plate with piezoelectric elements;Takeshi Nakahara et al; Proc. of SPIE 5391, Smart Struc. & Materials, Jul. 2004.

* cited by examiner

SYSTEM AND METHOD FOR REGULATING EXHAUST GAS RECIRCULATION IN AN ENGINE

BACKGROUND

The subject matter disclosed herein relates to a system and method for regulating an amount of exhaust gas recirculation ("EGR") gas administered to an internal combustion engine.

Combustion engines typically combust a carbonaceous fuel, such as natural gas, gasoline, diesel, and the like, and use the corresponding expansion of high temperature and pressure gases to apply a force to certain components of the engine (e.g., piston disposed in a cylinder) to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids (e.g., hot gases) may then be directed to exit the cylinder via an exhaust valve. Some exhaust gas may be re-circulated such that the EGR gas is fed back into the cylinder. EGR gas may reduce nitrogen oxide ($NO_X$) emissions as well as reduce in-cylinder temperature. Ultimately, the carbonaceous fuel is transformed into mechanical motion, which may drive a load. For example, the load may be a generator that produces electric power. Effectively regulating the amount of EGR gas to the combustion engine may enable enhanced engine performance.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a system includes a combustion engine that includes an intake manifold and an exhaust manifold. The system also has an exhaust gas recirculation (EGR) system coupled to the combustion engine and configured to route exhaust generated by the combustion engine from the exhaust manifold to the intake manifold. Additionally, the system includes at least one knock sensor coupled to the combustion engine and a controller communicatively coupled to the combustion engine and the EGR system. The controller is configured to control operations of both the combustion engine and the EGR system, to receive a signal from the at least one knock sensor, to determine a value for at least one operating condition from the signal, and to estimate an amount of EGR gas in the combustion engine based at least on the value of the one operating condition.

In a second embodiment, a system includes a controller configured to receive a signal from at least one knock sensor coupled to a combustion engine, wherein the combustion engine is coupled to an exhaust gas recirculation (EGR) system. The controller is also configured to determine a value of at least one operating condition from the signal and to estimate an amount of EGR gas in the combustion engine based at least on the value of the one operating condition. Finally, the controller is configured to output a control action for the combustion engine or the EGR system based on the estimated amount of EGR gas in the combustion engine.

In a third embodiment, a method includes utilizing a controller to receive a signal from at least one knock sensor coupled to a combustion engine, wherein the combustion engine is coupled to an exhaust gas recirculation (EGR) system. Also, the method involves using the controller to determine a value of at least one operating condition from the signal and to estimate an amount of EGR gas in the combustion engine based at least on the value of the one operating condition. Finally, the method includes utilizing the controller to output a control action for the combustion engine or the EGR system based on the estimated amount of EGR gas in the combustion engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
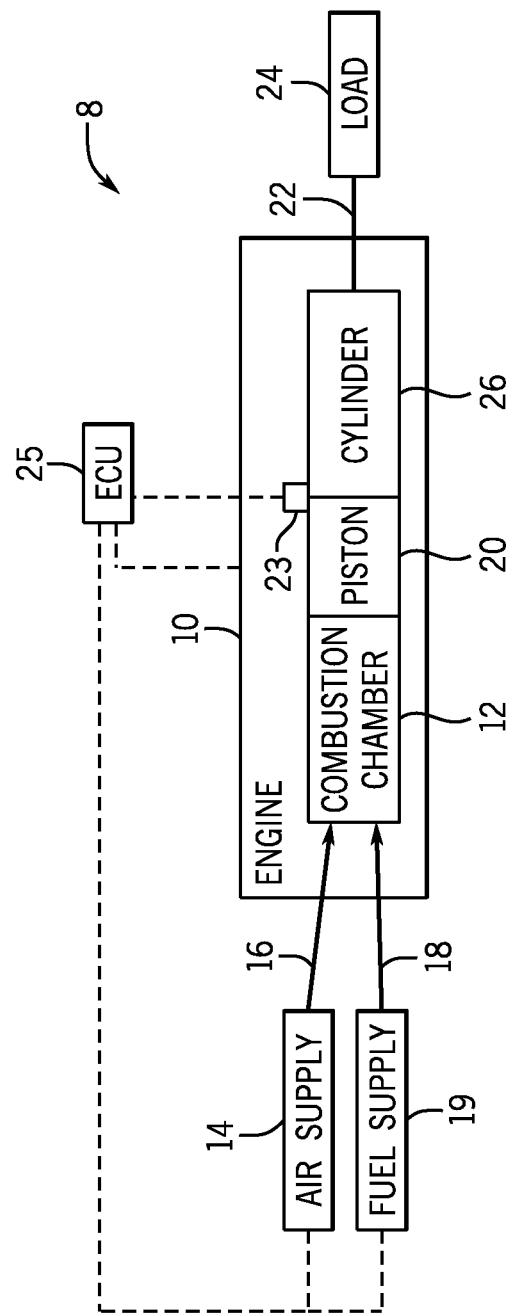
FIG. 1 illustrates a block diagram of an embodiment of a portion of an engine driven power generation system having a reciprocating internal combustion engine.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The presently disclosed systems and methods enable the control of an exhaust gas recirculation (EGR) system utilizing one or more sensors, such as a knock sensor. Engine knock refers to, or may include, combustion of an oxidant/fuel mixture (e.g., air/fuel mixture) at an unexpected time during the engine cycle, e.g., outside a normal window of time for combustion. A knock sensor may include an acoustic or sound sensor, a vibration sensor, or any combination thereof. In particular, embodiments of the present disclosure include an internal combustion engine (e.g., a reciprocating internal combustion engine such as a diesel, gasoline, or gas engine) that includes an intake manifold and exhaust manifold. The combustion engine is coupled to an EGR system that routes exhaust generated by the combustion engine from the exhaust manifold to the intake manifold. A controller (e.g., a processor-based controller) may control operations of both the combustion engine and the EGR system. For example, the controller may utilize a measured operating condition value (e.g., peak firing pressure, in-cylinder pressure, torque output, or load based on a knock sensor measurement) to execute a control action for the combustion engine or the EGR system. The controller may regulate an EGR flow rate (e.g., via changing EGR flow rate, EGR valve trim, EGR valve position, etc.) based on the knock sensor measurement. In certain embodiments, the controller may also determine a flow rate adjustment to a desired amount of EGR in an internal combustion engine based on a difference between an expected operating condition value and the measured (e.g., estimated) operating condition value. The controller (e.g., via an EGR control device) may generate a control signal to adjust a position of the EGR valve (e.g., via one or more actuators). Knock sensors may provide feedback as to how much EGR gas enters each cylinder of an internal combustion engine based on in-cylinder operating conditions. Feedback from the knock sensor may be more reliable than that provided by in-cylinder pressure sensors. Additionally, knock sensors are less expensive and more robust than in-cylinder pressure sensors.

To more clearly and concisely describe the subject matter of the claimed invention, the following definitions are provided for specific terms, which are used in the following description and the appended claims.

As used herein, the term "estimated amount" may refer to, or include, an estimate of an actual operating parameter (e.g., based on a signal, such as a vibrational signature or sound signature, received from the knock sensor) of an engine during current operation of the engine.

As used herein, the term "expected amount" may refer to an expectation that a first operating parameter of an engine will have a certain value during operation of the engine based on one or more correlations between the first operating parameter and a second operating parameter. The correlations may include a parameter correlation tool (e.g., look-up tables, computer models, equations, algorithms, or any combination thereof). In particular, the first operating parameter may be unknown, while the second operating parameter may be known or estimated to enable determination of an expected amount of the first operating parameter using the parameter correlation tool.

As used herein, the term "effective amount" may refer to an amount of an operating parameter that is within a range of values (e.g., between an upper limit and a lower limit) corresponding to healthy engine performance. For example, an effective amount of EGR gas administered to a cylinder of an engine may refer to an amount between an upper limit of EGR gas (e.g., an amount of EGR gas that may lead to misfire) and a lower limit of EGR gas (e.g., an amount of EGR gas that may lead to an engine knock event).

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An oxidant supply 14 (e.g., an air supply) is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example. The fuel 18 may also include a variety of liquid fuels, such as gasoline or diesel fuel.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders 26 (e.g., 1-24). For example, in certain embodiments, the system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders 26 and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensor 23 may sense vibrations, acoustics, or sound caused by combustion in the engine 10, such as vibrations, acoustics, or sound due to detonation, pre-ignition, and or pinging. Therefore, the knock sensor 23 may include an acoustic or sound sensor, a vibration sensor, or a combination thereof. For example, the knock sensor 23 may include a piezoelectric vibration sensor. The knock sensor 23 may monitor acoustics and/or vibration associated with combustion in the engine 10 to detect a knock condition, e.g., combustion at an unexpected time not during a normal window of time for combustion. The knock sensor 23 is shown communicatively coupled to a control system or controller 25, such as an engine control unit (ECU) 25. During operations, signals from the knock sensor 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust EGR gas flow to the engine 10 to eliminate knocking.

Figure 2:
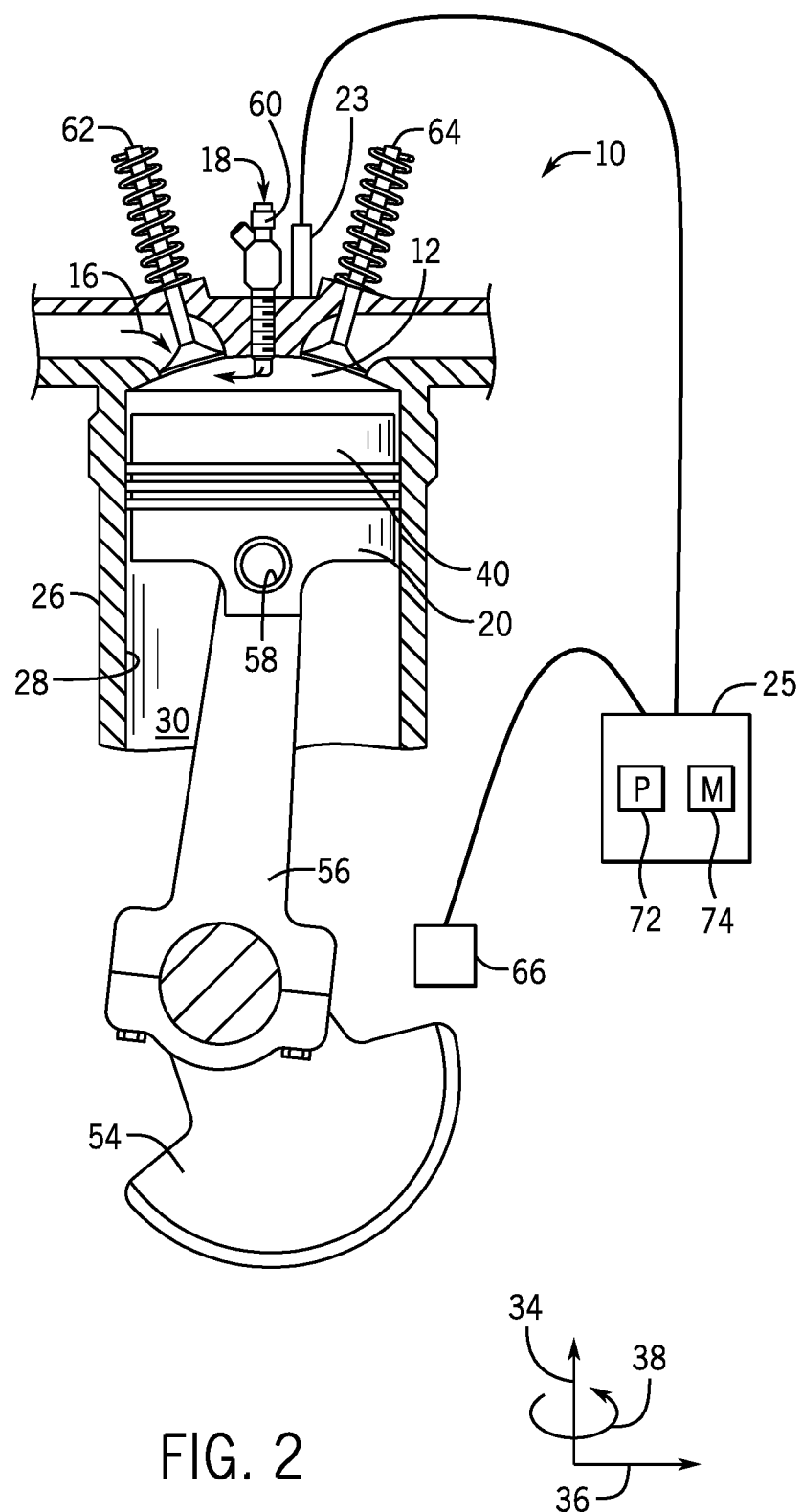
FIG. 2 illustrates a cross-sectional side view of an embodiment of a piston-cylinder assembly having a piston disposed within a cylinder of the reciprocating engine of FIG. 1.

FIG. 2 is a cross-sectional side view of an embodiment of a piston-cylinder assembly having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of oxidant (e.g., air 16) to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 may cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from TDC to BDC or from BDC to TDC, the crankshaft 54 rotates one half of a revolution. Each movement of the piston 20 from TDC to BDC or from BDC to TDC is called a stroke, and engine 10 embodiments may include two-stroke engines, three-stroke engines, four-stroke engines, five-stroke engines, six-stroke engines, or more.

During engine 10 operations, a sequence including an intake process, a compression process, a power process, and an exhaust process typically occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC, while keeping the exhaust valve 64 open. The exhaust process thus expels the spent fuel-air mixture through the exhaust valve 64. It is to be noted that more than one intake valve 62 and exhaust valve 64 may be used per cylinder 26

The depicted engine 10 may include a crankshaft sensor 66, knock sensor 23, and the engine control unit (ECU) 25, which includes a processor 72 and memory 74. The crankshaft sensor 66 senses the position and/or rotational speed of the crankshaft 54. Accordingly, a crank angle or crank timing information may be derived. That is, when monitoring combustion engines, timing is frequently expressed in terms of crankshaft angle. For example, a full cycle of a four stroke engine 10 may be measured as a 720° cycle. The knock sensor 23 may be a piezoelectric accelerometer, a microelectromechanical system (MEMS) sensor, a Hall effect sensor, a magnetostrictive sensor, and/or any other sensor designed to sense vibration, acceleration, acoustics, sound, and/or movement. In other embodiments, the sensor 23 may not be a knock sensor, but any sensor that may sense vibration, pressure, acceleration, deflection, or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder may include one or more knock sensors 23. The crankshaft sensor 66 and the knock sensor 23 are shown in electronic communication with the engine control unit (ECU) 25. The ECU 25 includes a processor 72 and a memory 74. The ECU 25 includes non-transitory code or instructions stored in a machine-readable medium (e.g., the memory 74) and used by a processor (e.g., the processor 72) to implement the techniques disclosed herein. The memory may store computer instructions that may be executed by the processor 72. Additionally, the memory may store look-up tables and/or other experimental data relating to normal operating conditions of the engine 10 that may be compared to signals received from the knock sensor 23 and/or the crankshaft sensor 66. The ECU 25 monitors and controls the operation of the engine 10, for example, by adjusting combustion timing, timing of opening/closing valves 62 and 64, adjusting the delivery of fuel and oxidant (e.g., air), and so on.

Figure 3:
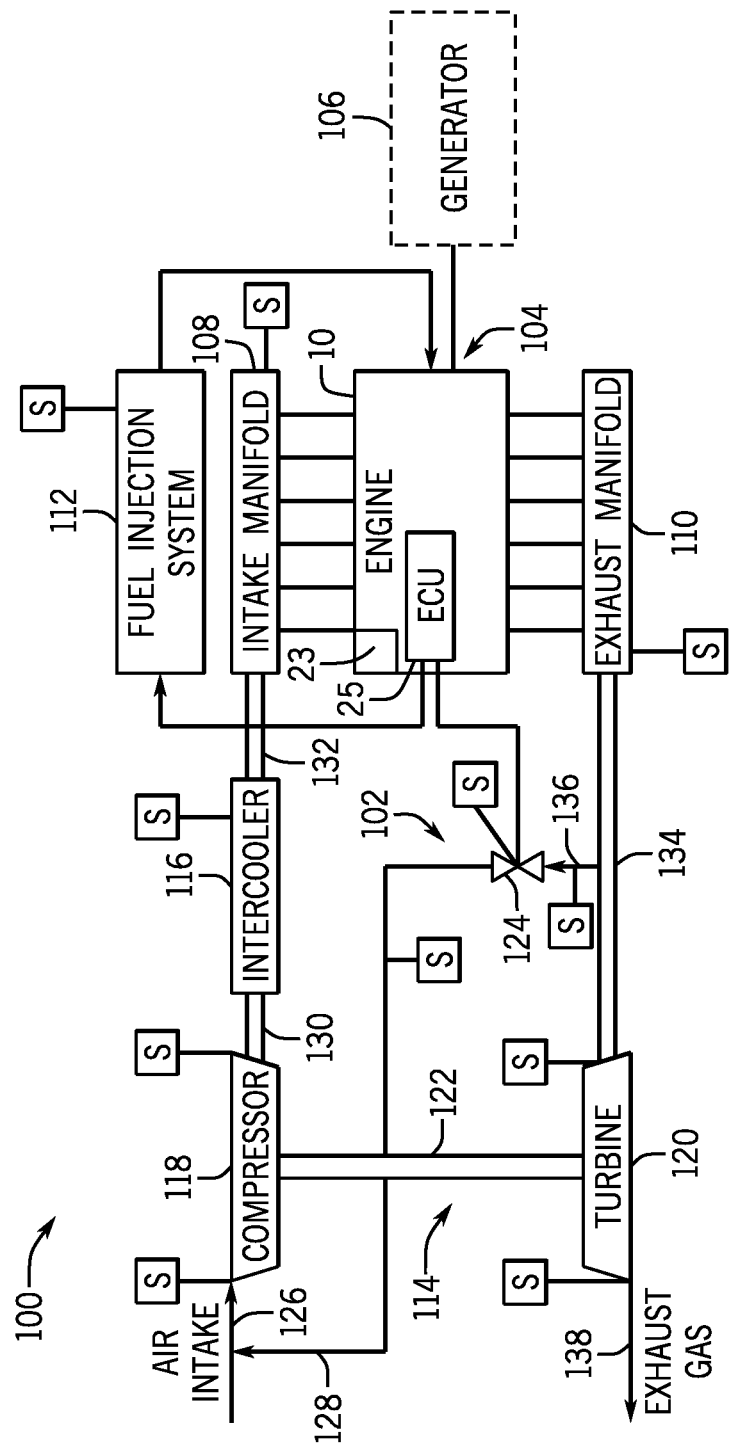
FIG. 3 illustrates a block diagram of an embodiment of a system with an exhaust gas recirculation (EGR) system coupled to an internal combustion engine system, such as the engine of FIGS. 1 and 2.

FIG. 3 illustrates a block diagram of a system 100 that includes an exhaust gas recirculation (EGR) system 102 coupled to an internal combustion engine system 104. As described in detail below, the disclosed system 100 may utilize a knock sensor 23 output as a control signal for EGR flow rate (e.g., to control the EGR flow rate based on a measured (e.g., estimated) operating condition signal from the knock sensor 23). The system 100 may include a vehicle, such as a locomotive, an automobile, a bus, or a boat. Alternatively, the system 100 may include a stationary system, such as a power generation system having the internal combustion system 104 coupled to an electrical generator 106. The internal combustion engine system 104 may include the engine 10, which may have an intake manifold 108, an exhaust manifold 110, a fuel injection system 112, and the ECU 25 (e.g., a controller).

The engine 10 may include a reciprocating or piston engine (e.g., internal combustion engine). The engine 10 may include a spark-ignition engine or a compression-ignition engine. The engine 10 may include a natural gas engine, gasoline engine, diesel engine, or dual fuel engine. The engine 10 may be a two-stroke engine, three-stroke engine, four-stroke engine, five-stroke engine, or six-stroke engine. The engine 10 may also include any number of cylinders 26 (e.g., 1-24 cylinders or any other number of cylinders) and associated piston 20 and liners.

In certain embodiments, the system 100 may also include a turbocharger 114 and an intercooler 116 (e.g., a heat exchanger). The illustrated turbocharger 114 includes a compressor 118 coupled to a turbine 120 via a drive shaft 122. The turbine 120 is driven by exhaust gas, and in turn, drives the compressor 118. The compressor 118 compresses the intake air 16 and EGR flow for intake into the intake manifold 108 after cooling by the intercooler 116. The EGR system 102 includes an EGR valve 124 disposed downstream from the exhaust manifold 110 and upstream from the compressor 118.

The ECU 25 may be coupled to various sensors and devices throughout the system 100 (including the internal combustion system 104 and the EGR system 102). For example, the illustrated ECU 25 is coupled to the EGR valve 124 and the fuel injection system 112. However, the ECU 25 may be coupled to sensors (represented by S in FIG. 3) and control features of each illustrated component of the system 100, among many others. The sensors may include atmospheric and engine sensors, such as pressure sensors, temperature sensors, speed sensors, and so forth. For example, the sensors may include knock sensors, $NO_X$ sensors, oxygen or lambda sensors, engine air intake temperature sensors, engine air intake pressure sensors, jacket water temperature sensors, EGR flow rate sensors, EGR temperature sensors, EGR inlet pressure sensors, EGR valve pressure sensors, EGR valve position sensors, engine exhaust temperature sensors, engine exhaust pressure sensors, and exhaust gas composition sensors. Other sensors may also include compressor inlet and outlet sensors for temperature and pressure. The ECU 25 may control other devices (e.g., the EGR valve) via one or more actuators.

In certain embodiments, the engine 10 may include one or more knock sensors 23. The knock sensors 23 may be located outside of the cylinders of the engine 10. The knock sensors 23 may be piezoelectric accelerometers, or any other sensors designed to sense vibration, acoustics, sound, acceleration, or movement. The knock sensors 23 may exhibit a response to vibration, acoustics, sound, acceleration, or movement of the cylinder, which may be correlated to an operating condition of the engine 10. For example, a frequency of vibration measured by the knock sensor 23 may correspond to a pressure within the cylinder. Such a measurement may enable the ECU 25 to accurately estimate an operating condition value. As will be described in detail herein, in certain embodiments, accurately estimated operating conditions may be valuable in terms of optimizing engine performance.

In the illustrated embodiment of FIG. 3, the system 100 intakes air into the compressor 118 as illustrated by arrow 126. At an air intake section, the compressor 118 intakes a portion of the exhaust (e.g., EGR flow) from the exhaust manifold 110 (e.g., at an exhaust section) via control of the EGR valve 124 as indicated by arrow 128. In turn, the compressor 118 compresses the intake air and the portion of the engine exhaust (e.g., EGR flow) and outputs the compressed gas to the intercooler 116 via a conduit 130. The intercooler 116 may function as a heat exchanger to remove heat from the compressed gas as a result of the compression process. The intercooler 116 may be a heat exchanger (e.g., direct or indirect heat exchanger) that utilizes water, air, or another source of coolant. As appreciated, the compression process may heat up the intake air and the portion of the exhaust gas, and thus is cooled prior to intake into the intake manifold 108. As depicted, the compressed and cooled gas (e.g., air and EGR gas) passes from the intercooler 116 to the intake manifold 108 via conduit 132.

The intake manifold 108 then routes the compressed gas into the engine 10 (e.g., into piston cylinder assemblies). Fuel from the fuel injection system 112 may be injected directly into the engine cylinders. The ECU 25 may control the fuel injection timing of the fuel injection system 112, such that the fuel is injected at the appropriate time into the engine 10. Combustion of the fuel and air (or oxidant) generates hot combustion gases, which in turn drive the pistons (e.g., reciprocating pistons) within their respective cylinders.

In turn, the engine 10 exhausts the products of combustion from the various piston cylinder assemblies through the exhaust manifold 110. The exhaust from the engine 10 may then pass through a conduit 134 (or exhaust section) from the exhaust manifold 110 to the turbine 120. In addition, a portion of the exhaust may be routed from the conduit 134 (or exhaust section) to the EGR valve 124 as illustrated by arrow 136. At this point, a first portion of the exhaust passes to the air intake section of the compressor 118 as illustrated by the arrow 128 mentioned above. In addition, a second portion of the exhaust gas drives the turbine 120, such that the turbine 120 rotates the shaft 122 and drives the compressor 118. The second portion of the exhaust gas then passes out of the system 100 and particularly the turbine 120 as indicated by arrow 138.

The ECU 25 may control the EGR valve 124 (e.g., via one or more actuators), such that a suitable portion of the exhaust is recirculated into the compressor 118 depending on various operating parameters of the system 100. For example, the knock sensor 23 may provide sensor feedback to monitor an operating condition of the system 100 (e.g., in-cylinder pressure, torque output, load, etc.) and send a signal that corresponds to the operating condition to the ECU 25. For example, it is now recognized that a vibration signature or sound signature of the knock sensor 23 may be used to determine the in-cylinder pressure, torque output, or load for each combustion engine 10 cycle. The ECU 25 may also receive a signal that corresponds to an expected flow rate of EGR gas in the engine 10 (e.g., from a flow rate sensor positioned downstream from the EGR valve 124). The processor 72 of the ECU may look up an estimated EGR gas value corresponding to at least the operating condition signal in a parameter correlation tool (e.g., a look-up table, a computer model, an equation, an algorithm, or some other instrument for associating operating condition parameters to one another when the engine 10 is operating in a healthy state) stored in the memory 74. The processor 72 may compare the estimated EGR gas value from the parameter correlation tool to the expected flow rate of EGR gas in the engine to determine whether an effective amount of EGR gas was administered to the engine 10. Based on this comparison, the ECU 25 may send a signal to one or more actuators to adjust the EGR valve 124 accordingly. For example, if the expected flow rate of EGR gas is greater than the estimated EGR gas value, the processor 72 may send a signal to the one or more actuators to increase the flow of EGR gas to the engine 10. By cross-checking the amount of EGR gas in the engine 10, the performance of the engine 10 may be enhanced.

While the parameter correlation tool may be a look-up table, a computer model, an equation, an algorithm, or some other instrument for associating operating condition parameters to one another when the engine 10 is operating in a healthy state, the remainder of the present disclosure will refer to the parameter correlation tool as a look-up table.

In some embodiments, the system 100 may not include all of the components illustrated in FIG. 3. In addition, the system 100 may include additional components such as control components, aftertreatment components, and/or heat recovery components. For example, the EGR system 102 may include components to heat and/or cool the exhaust flow through the EGR system 102. The system 100 may include more than one intercooler 116. Also, the system 100 may include a variety of valves (e.g., fuel valves, pressure valves, etc.).

Figure 4:
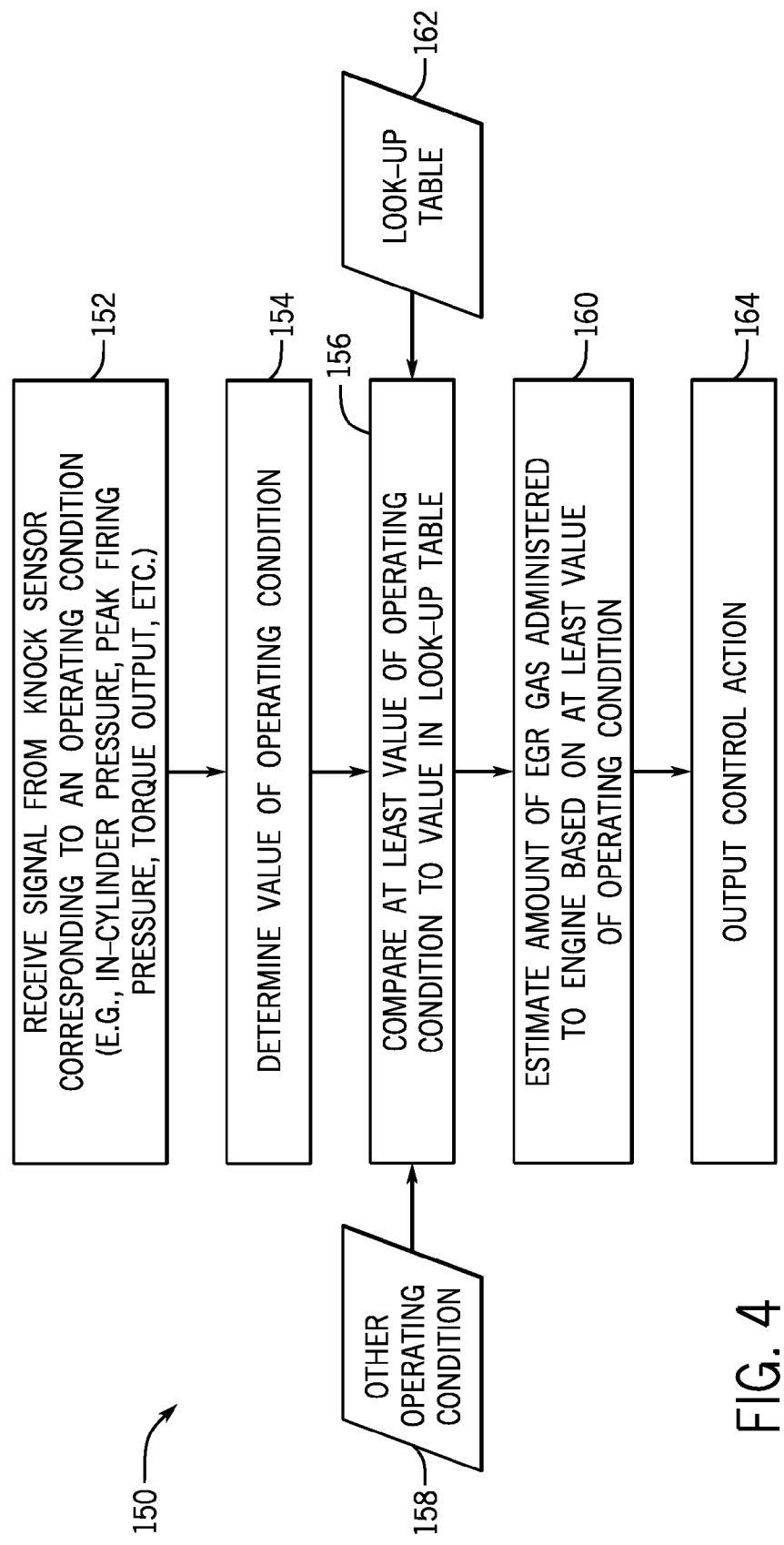
FIG. 4 illustrates a flow chart of an embodiment of a method for estimating an amount of EGR gas in an engine, such as the engine of FIGS. 1 and 2.

FIG. 4 illustrates a flow chart 150 for estimating an amount of EGR gas in an engine. In certain embodiments, all or some of the operations or steps illustrated in the flow chart 150 may be performed by the processor 72 of the ECU 25. For example, the processor 72 may execute programs to execute data stored in the memory 74. At block 152, the processor 72 may receive a signal from the knock sensor 23. The signal may be a vibration signature or a sound signature that can be used to determine an operating condition of the engine 10, such as peak firing pressure, in-cylinder pressure, torque output, load, or another operating condition of the engine 10, for example. At block 154, the processor 72 may convert the signal received from the knock sensor 23 into a value of the operating condition. For example, the knock sensor 23 may be a piezoelectric accelerometer, such that the processor 72 may receive a signal from the knock sensor 23 in the form of a voltage, change in voltage, vibrational signature, sound signature, or another knock sensor signature indicative of an operating condition. The processor 72 may then convert that signal into a corresponding value of an operating condition (e.g., peak firing pressure, in-cylinder pressure, torque output, or load) based on historical data, empirical data, knowledge based data, etc.

For example, the knock sensor 23 may be coupled or proximate to the cylinder of the reciprocating engine and may be communicatively coupled to the ECU 25. The knock sensor 23 may detect vibration or sound (e.g., vibrations of the cylinder) and the ECU 25 may convert a vibrational signature or sound signature of the cylinder, provided by the knock sensor 23, into useful parameters for determining combustion conditions in the cylinder. For example, the knock sensor 23 may detect vibrations or sound in or proximate to the cylinder and communicate a signal indicative of a vibrational signature or a sound signature to the ECU 25. The ECU 25 may, for example, convert the signal indicative of the vibrational signature or the sound signature to a parameter indicative of peak firing pressure, which describes a maximum in-cylinder pressure exerted by the expanding combustion gases on the piston during an expansion stroke. The parameter indicative of peak firing pressure may also be associated with a position of the piston within the cylinder (e.g., measured in crank angles at, for example, the time of ignition), a speed of the piston within the cylinder, an acceleration of the piston within the cylinder, or a pressure within the cylinder. In other words, operating peak firing pressure may be determined from any one of these parameters (e.g., position, speed, acceleration, or pressure) or estimated from the knock sensor signal.

At block 156, the processor 72 may utilize the measured operating condition value from the knock sensor 23 to estimate an amount of EGR gas in the engine 10. In certain embodiments, the processor 72 may utilize other known operating condition values 158 (e.g., position, speed, or acceleration of the piston or in-cylinder pressure) in addition to the measured operating condition value to estimate the amount of EGR gas in the engine 10. For example, the processor 72 may also utilize values that it has received from other sensors, such as an in-cylinder temperature (e.g., from a thermocouple or other temperature measurement device), an air/fuel ratio (e.g., from a flow sensor), engine rotational speed (e.g., revolutions per minute (RPM)), intake manifold pressure (e.g., from pressure sensors or pressure transducers), crankshaft 54 position (e.g., from an encoder, flywheel pickup, or crankshaft sensor 66), gas fuel pressure (e.g., from pressure sensors or pressure transducers), the EGR valve 124 position, fuel quality, angle of spark firing, and/or spark timing.

At block 160, the amount of EGR gas in the engine 10 may be estimated by the processor 72. To estimate the amount of EGR gas in the engine 10, the processor 72 may utilize a look-up table 162 (e.g., the parameter correlation tool). The look-up table 162 may include a table of EGR gas amounts corresponding to a variety of operating condition values (e.g., in-cylinder pressure, torque output, load, or other operating condition values). Therefore, the processor 72 may utilize at least the measured value of the operating condition and estimate the corresponding amount of EGR gas using the look-up table 162. For example, the processor 72 may use a look-up table similar to that illustrated in FIG. 7. The look-up table 162 will be described in more detail with respect to FIG. 7.

Block 164 shows that the processor 72 may send a control signal after estimating the value of the amount of EGR gas in the engine 10. For example, the processor 72 may send a signal to one or more actuators to adjust the EGR valve 124. The signal may command the one or more actuators to change the position of the EGR valve 124 such that the flow of EGR gas increases or decreases. The signal sent by the processor 72 may depend on the value of the measured operating condition and/or the value of other operating conditions. For example, the in-cylinder pressure may have an inverse relationship to the amount of EGR gas administered to the engine 10. Therefore, when the peak firing pressure is too high, the processor 72 may send a signal to adjust the EGR gas valve 124 (e.g., via one or more actuators) to increase the flow of EGR gas to the engine 10. Conversely, if the peak firing pressure is too low, the processor 72 may send a signal to adjust the EGR gas valve 124 (e.g., via one or more actuators) to decrease the flow of EGR gas to the engine 10.

Figure 5:
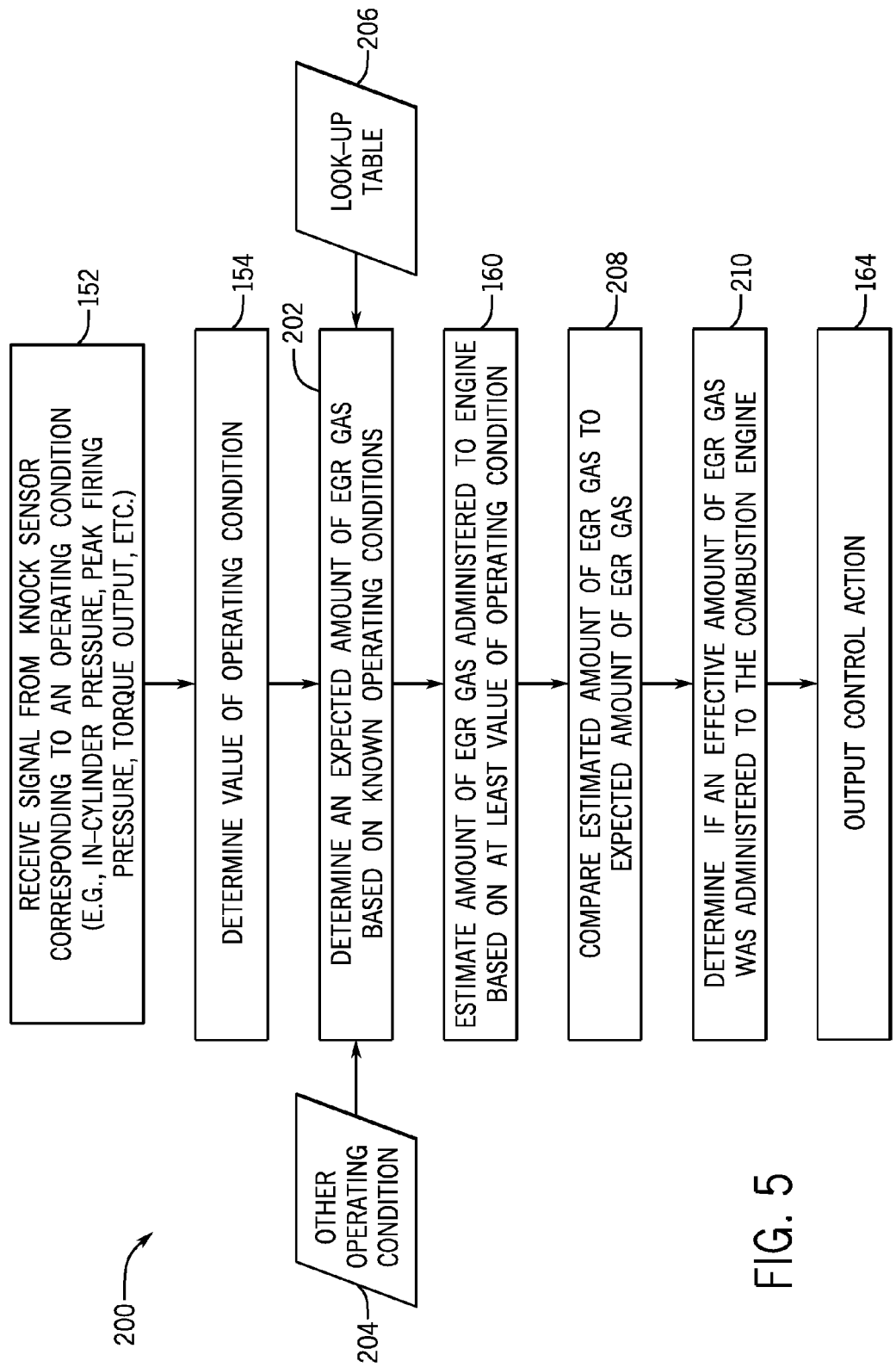
FIG. 5 illustrates a flow chart of an embodiment of a method for determining whether an effective amount of EGR gas was administered to the engine, such as the engine of FIGS. 1 and 2.

FIG. 5 illustrates a flow chart 200 that may be used to determine whether an effective amount of EGR gas was administered to the engine 10. In certain embodiments, all or some of the operations or steps illustrated in the flow chart 200 may be performed by the processor 72 of the ECU 25. For example, the processor 72 may execute programs to execute data stored on the memory 74. At block 152, the processor 72 may receive a signal from the knock sensor 23. The signal may correspond to an operating condition of the engine 10, such as peak firing pressure, in-cylinder pressure, torque output, load, or another operating condition of the engine 10. At block 154, the processor 72 may convert the signal received from the knock sensor 23 into a value of the operating condition. For example, the knock sensor 23 may be a piezoelectric accelerometer, such that the processor 72 may receive a signal from the knock sensor 23 in the form of a voltage, change in voltage, vibrational signature, sound signature, or another knock sensor signature indicative of an operating condition of the engine 10. The processor 72 may then have to convert that signal into a corresponding value of an operating condition (e.g., peak firing pressure, in-cylinder pressure, torque output, or load).

At block 202, the processor 72 may determine an expected amount of EGR gas based on known operating conditions 204 and a look-up table 206. The look-up table 206 may be the same or different from the look-up table 162. The processor 72 may determine the expected amount of EGR gas by finding a corresponding EGR gas value in the look-up table 206 with at least one known (e.g., measured from a sensor) operating condition. The look-up table 206 may be a table that includes a plurality of EGR gas quantities, where each EGR gas value corresponds to a value of at least one other operating condition of the engine 10. For example, the processor 72 may receive values corresponding to various operating conditions from other sensors. Such operating conditions may include an in-cylinder temperature (e.g., from a thermocouple or other temperature measurement device), an air/fuel ratio (e.g., from a flow sensor), engine rotational speed (e.g., revolutions per minute (RPM)), intake manifold pressure (e.g., from pressure sensors or pressure transducers), crankshaft 54 position (e.g., from an encoder, flywheel pickup, or the crankshaft sensor 66), gas fuel pressure (e.g., from pressure sensors or pressure transducers), the EGR valve 124 position, fuel quality, angle of spark firing, and/or spark timing.

Therefore, the processor may utilize at least one known (e.g., measured from a sensor such as a knock sensor) operating condition value and find the corresponding amount of EGR gas in the look-up table 206. For example, the processor 72 may use a look-up table similar to that illustrated in FIG. 7. The look-up table 206 will be described in more detail with respect to FIG. 7.

At block 160, the processor 72 may estimate an amount of EGR gas in the engine 10 using the value of the operating condition determined in block 154 in a similar manner as described with respect to embodiments recited above. For example, the processor 72 may receive a signal from the knock sensor 23 that corresponds to an operating condition of the internal combustion engine 10. The processor 72 may then use the look-up table 162 or 206 to determine the estimated amount of EGR gas in the engine 10.

At block 208 and block 210, the processor 72 may compare the estimated amount of EGR gas to the expected amount of EGR gas to determine whether an effective amount of EGR gas was administered to the engine 10. In certain embodiments, the expected amount of EGR gas may be a range of EGR gas values. For example, when the estimated amount of EGR gas in the engine 10 exceeds an upper limit of the expected EGR gas range, the engine 10 may misfire due to low power output and an inability to maintain a given speed and load. Thus, the engine would not be receiving an effective amount of EGR gas since it would be operating at sub-optimal conditions. Alternatively, when the estimated amount of EGR gas in the engine 10 is less than a lower limit of the expected EGR gas range, an engine knocking event may occur. Engine knocking may arise when not enough EGR gas is present such that the timing of combustion is premature. Therefore, when the estimated amount of EGR gas is below the lower limit of the expected EGR gas range, the engine 10 is not receiving an effective amount of EGR gas. When the engine 10 fails to receive an effective amount of EGR gas, an adjustment to the EGR valve 124 may be performed.

Block 164 shows that the processor 72 may send a control signal after determining that the engine 10 did not receive an effective amount of EGR gas. For example, the processor 72 may send a signal to one or more actuators to adjust the EGR valve 124. The signal may command the one or more actuators to change the position of the EGR valve 124 such that the flow of EGR gas increases or decreases. For example, when the estimated amount of EGR gas is less than the lower limit of the expected amount of EGR gas range, the processor 72 may send a signal to adjust the EGR valve 124 (e.g., via one or more actuators) to increase a flow rate of EGR gas into the engine 10. Conversely, when the estimated amount of EGR gas is more than the upper limit of the expected amount of EGR gas range, the processor 72 may send a signal to adjust the EGR valve 124 (e.g., via one or more actuators) to decrease the flow rate of EGR gas into the engine 10.

Figure 6:
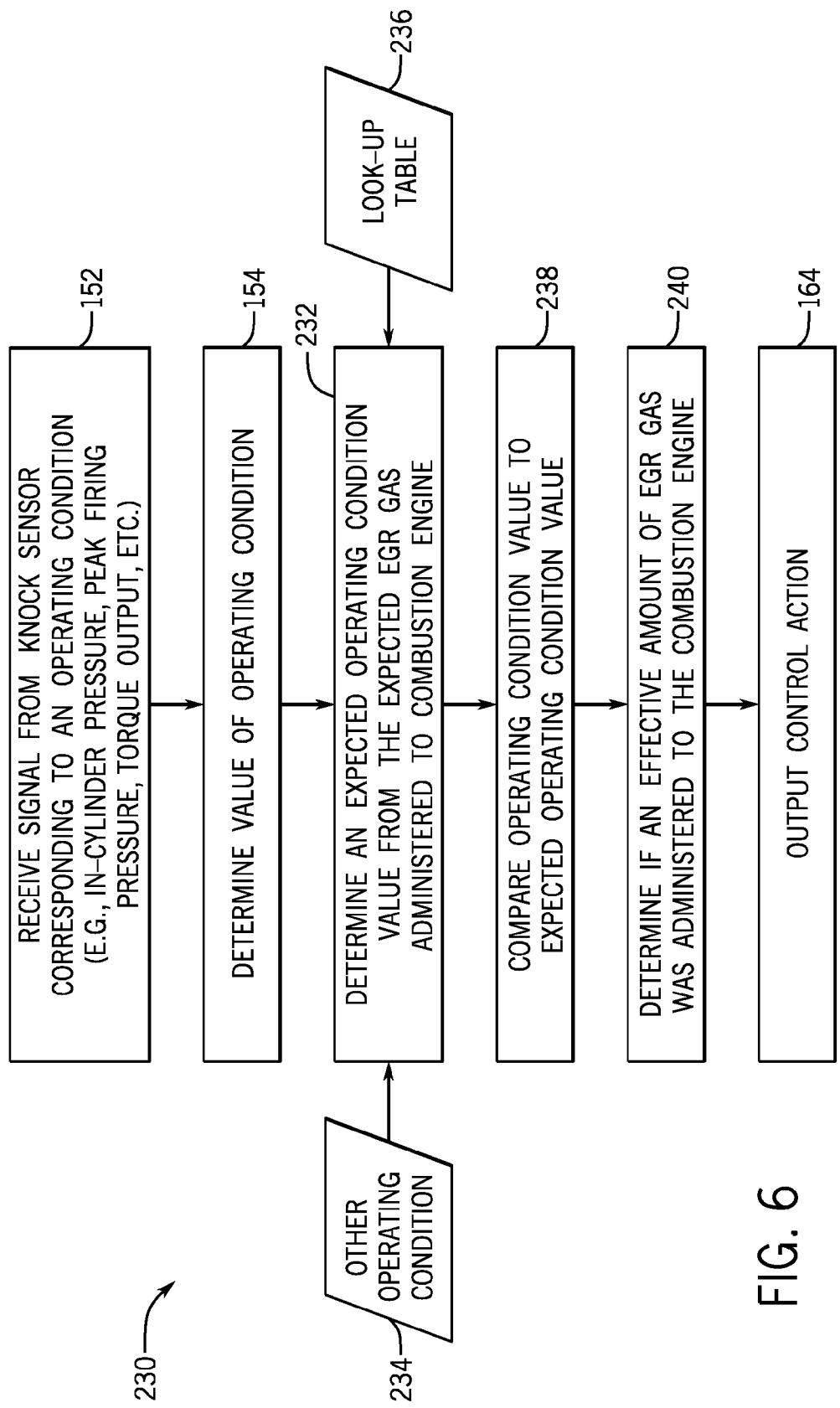
FIG. 6 illustrates a flow chart of an embodiment of a method for determining whether an effective amount of EGR gas was administered to the engine, such as the engine of FIGS. 1 and 2.

FIG. 6 illustrates another flow chart 230 for determining whether an effective amount of EGR gas was administered to the engine 10. In certain embodiments, all or some of the operations or steps illustrated in the flow chart 230 may be performed by the processor 72 of the ECU 25. For example, the processor 72 may execute programs to execute data stored in the memory 74. At block 152, the processor 72 may receive a signal from the knock sensor 23. The signal may correspond to an operating condition of the engine 10, such as peak firing pressure, in-cylinder pressure, torque output, load, or another operating condition of the engine 10. At block 154, the processor 72 may convert the signal received from the knock sensor 23 into a value of the operating condition. For example, the knock sensor 23 may be a piezoelectric accelerometer, such that the processor 72 may receive a signal from the knock sensor 23 in the form of a voltage, change in voltage, vibrational signature, sound signature, or another knock sensor signature indicative of an operating condition of the engine 10. The processor 72 may then have to convert that value into a corresponding value of an operating condition (e.g., peak firing pressure, in-cylinder pressure, torque output, or load).

At block 232, the processor 72 may determine an expected operating condition value. To determine the expected operating condition value, the processor 72 may have a value of the expected amount of EGR gas in the engine 10. In certain embodiments, the processor 72 may derive the expected amount of EGR gas in the same manner as in block 202 of flow chart 200 (e.g., using at least one known, or measured, operating condition and a look-up table). Alternatively, the processor 72 may determine the value of the expected amount of EGR gas in the engine 10 by receiving a signal from a flow meter or other sensor that measures a flow rate of the EGR gas. For example, a flow meter may measure the amount of EGR gas that exits the EGR gas valve 124 and send a signal to the processor 72 that corresponds to an expected amount of EGR gas in the engine 10.

To determine the expected operating condition value, the processor 72 may use other known operating conditions 234 and/or a look-up table 236. The look-up table 236 may be the same or different from the look-up tables 162 and 206. The processor 72 may determine the expected operating condition by finding a corresponding operating condition value in the look-up table 236 using the expected amount of EGR gas in the engine 10. The look-up table 236 may be a table that includes a plurality of operating condition quantities, where each operating condition value corresponds to a value of at least the amount of EGR gas in the engine 10. In certain embodiments, the expected amount of EGR gas in the look-up table may be in the form of a range (e.g., an upper limit and a lower limit). Additionally, the processor 72 may receive values corresponding to other operating conditions from various sensors. Such other operating conditions may include an in-cylinder temperature (e.g., from a thermocouple or other temperature measurement device), an air/fuel ratio (e.g., from a flow sensor), engine rotational speed (e.g., revolutions per minute (RPM)), intake manifold pressure (e.g., from pressure sensors or pressure transducers), crankshaft 54 position (e.g., from an encoder, flywheel pickup, or crankshaft sensor 66), gas fuel pressure (e.g., from pressure sensors or pressure transducers), the EGR valve 124 position, fuel quality, angle of spark firing, and/or spark timing. Therefore, in certain embodiments, the expected amount of EGR gas in the engine 10 may be calculated using at least one known value of an operating condition, and then an expected value of a different, unknown operating condition may be determined by utilizing the expected EGR gas value and the look-up table 236.

At block 238, the expected operating condition value may be compared to the operating condition value corresponding to the signal received from the knock sensor 23.

At block 240, the processor 72 may determine whether the effective amount of EGR gas was administered to the combustion engine by comparing the expected operating condition value and the operating condition value determined from the signal received from the knock sensor 23 (e.g., an estimated operating condition value). In certain embodiments, the expected operating condition value may be a range of expected operating condition values (e.g., an upper limit and a lower limit). For example, if the measured operating condition is an in-cylinder pressure and the estimated in-cylinder pressure value exceeds an upper limit of the expected in-cylinder range, the engine may be receiving too little EGR gas (e.g., an amount of EGR gas that is not an effective amount). Similarly, when the estimated in-cylinder pressure value is less than a lower limit of the expected in-cylinder pressure range, the engine 10 may be receiving too much EGR gas (e.g., an amount of EGR gas that is not an effective amount). When the engine 10 fails to receive an effective amount of EGR gas, an adjustment to the EGR valve 124 may be performed.

Block 164 shows that the processor 72 may send a control signal after determining that the engine 10 did not receive the effective amount of EGR gas. For example, the processor 72 may send a signal to one or more actuators of the EGR valve 124. The signal may command the EGR valve 124 to change its position such that the flow of EGR gas increases or decreases. For example, when the engine 10 receives too little EGR, the processor 72 may send a signal to adjust the EGR valve 124 (e.g., via one or more actuators) to increase a flow rate of EGR gas into the engine 10. Conversely, when the engine 10 receives too much EGR gas, the processor 72 may send a signal to adjust the EGR valve 124 (e.g., via one or more actuators) to decrease a flow rate of EGR gas into the engine 10.

Figure 7:
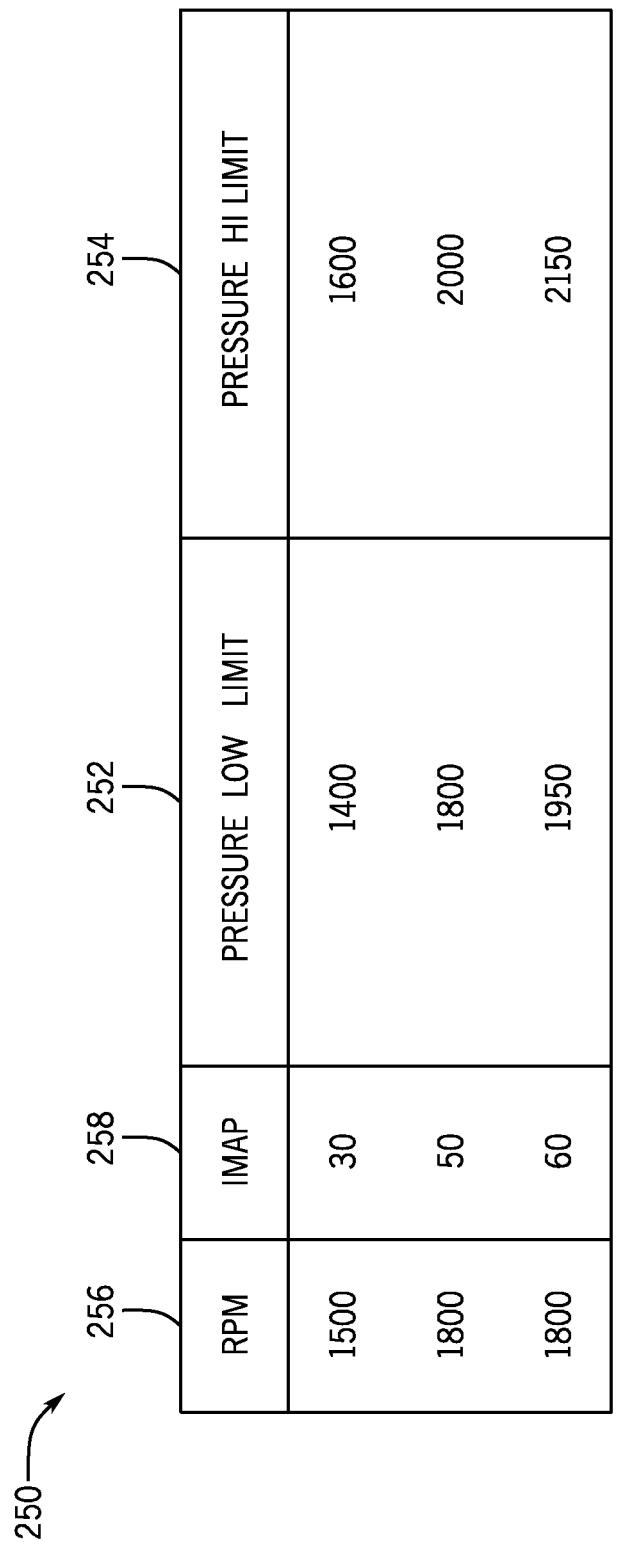
FIG. 7 illustrates an embodiment of a portion of a look-up table that may be used in a control system and process for the engine, such as the engine of FIGS. 1 and 2.

FIG. 7 illustrates an embodiment of a portion 250 of a look-up table 162, 206, and/or 236. The example portion 250 shows a peak firing pressure lower limit 252 and a peak firing pressure upper limit 254 that correspond to two operating conditions: rotational speed of the engine (RPM) 256 and intake manifold pressure ("IMAP") 258. Therefore, the processor 72 may receive known (e.g., measured) values for the rotational speed 256 and/or the intake manifold pressure 258 and determine the expected peak firing pressure range 252, 254 of the cylinder 26. A variety of other operating condition values may also be included in look-up tables 162, 206, and 236. For example, the look-up tables 162, 206, and/or 236 may include EGR gas in the engine 10, in-cylinder temperature (e.g., from a thermocouple or other temperature measurement device), an air/fuel ratio (e.g., from a flow sensor), engine rotational speed (e.g., revolutions per minute (RPM)), intake manifold pressure (e.g., from pressure sensors or pressure transducers), crankshaft 54 position (e.g., from an encoder or flywheel pickup), gas fuel pressure (e.g., from pressure sensors or pressure transducers), the EGR valve 124 position, fuel quality, angle of spark firing, and/or spark timing.

The portion 250 of the look-up table may be formed by laboratory test data. For example, a test engine may be operated at a known air/fuel ratio, while other operating conditions are measured using various sensors. Once the test engine reaches a steady state (e.g., the measured operating conditions do not substantially change from one engine cycle to the next), the operating conditions may be recorded and entered into the look-up table. The air/fuel ratio may be adjusted to a different known value, and the operating conditions at that different air/fuel ration value may again be recorded. The air/fuel ratio may continue to be adjusted so that the engine 10 operates at all feasible air/fuel ratio values. Then the corresponding operating conditions are recorded at each air/fuel ratio. Such an experiment may be repeated by adjusting a variety of known engine operating conditions other than the air/fuel ratio such as in-cylinder temperature, engine rotational speed, intake manifold pressure, crankshaft 54 position, gas fuel pressure, the EGR valve 124 position, fuel quality, angle of spark firing, and/or spark timing.

Technical effects of the invention include receiving a signal from a knock sensor and relating the signal to an operating condition parameter of an internal combustion engine. The operating condition parameter may be used to determine whether an effective amount of EGR gas was administered to the internal combustion engine, so that a flow of EGR gas to the internal combustion engine can be adjusted accordingly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. An internal combustion engine system, comprising:
a controller comprising a processor and a non-transitory memory encoding processor-executable instructions to:
receive a signal from at least one knock sensor coupled to a combustion engine, wherein the combustion engine is coupled to an exhaust gas recirculation (EGR) system;
determine a value of at least one operating condition based on the signal from the at least one knock sensor;

estimate an amount of EGR gas in the combustion engine based at least on the value of the at least one operating condition; and generate a control signal for adjusting a position of an EGR valve of the EGR system based on the estimated amount of EGR gas in the combustion engine.

2. The system of claim 1, wherein the at least one operating condition comprises an in-cylinder pressure.

3. The system of claim 1, wherein the non-transitory memory of the controller further includes executable instructions to estimate the amount of EGR gas in the combustion engine by utilizing a look-up table to correlate the value of the at least one operating condition to the estimated amount of EGR gas.

4. The system of claim 1, wherein the non-transitory memory of the controller further includes executable instructions to utilize values of other operating conditions along with the value of the at least one operating condition to estimate the amount of EGR gas in the combustion engine.

5. The system of claim 1, wherein the non-transitory memory of the controller further includes executable instructions to compare an estimated amount of EGR gas in the combustion engine to an expected amount of EGR gas in the combustion engine to determine whether an effective amount of EGR gas was administered into the combustion engine.

6. The system of claim 5, wherein the non-transitory memory of the controller further includes executable instructions to compare the value for the at least one operating condition to an expected value for the at least one operating condition to determine whether the effective amount of EGR gas was administered into the combustion engine.

7. A system, comprising:
a combustion engine comprising an intake manifold and an exhaust manifold;
an exhaust gas recirculation (EGR) system coupled to the combustion engine and configured to route exhaust generated by the combustion engine from the exhaust manifold to the intake manifold;
an exhaust gas recirculation valve disposed in the EGR system;
at least one knock sensor coupled to the combustion engine; and
a controller communicatively coupled to the combustion engine and the EGR valve of the EGR system, and comprising a processor and a non-transitory memory including executable instructions to:
control operations of both the combustion engine and the EGR valve of the EGR system;
receive a signal from the at least one knock sensor;
determine a value of at least one operating condition based on the signal from the at least one knock sensor;
estimate an amount of EGR gas in the combustion engine based at least on the value of the at least one operating condition; and
generate a control signal for adjusting a position of the EGR valve of the EGR system based on the estimated amount of EGR gas in the combustion engine.

8. The system of claim 7, wherein the at least one operating condition comprises an in-cylinder pressure.

9. The system of claim 8, wherein the in-cylinder pressure comprises a peak firing pressure.

10. The system of claim 7, wherein the at least one operating condition comprises a torque output.

11. The system of claim 7, wherein the at least one operating condition comprises a load.

12. The system of claim 7, wherein the non-transitory memory of the controller further includes executable instructions to estimate the amount of EGR gas in the combustion engine by utilizing a look-up table to correlate the value of the at least one operating condition to the estimated amount of EGR gas.

13. The system of claim 7, wherein the non-transitory memory of the controller further includes executable instructions to utilize values of other operating conditions along with the value of the at least one operating condition to estimate the amount of EGR gas in the combustion engine.

14. The system of claim 13, wherein the other operating conditions comprise at least one of an air to fuel ratio, an intake manifold pressure, a gas fuel pressure, an EGR valve position, a throttle valve position, a spark timing, an angle of spark firing, a fuel quality, a rotational speed, or any combination thereof.

15. The system of claim 7, wherein the non-transitory memory of the controller further includes executable instructions to compare the estimate of the amount of EGR gas in the combustion engine to an expected amount of EGR gas in the combustion engine to determine whether an effective amount of EGR gas was administered into the combustion engine.

16. The system of claim 15, wherein the non-transitory memory of the controller further includes executable instructions to compare the value for the at least one operating condition to an expected value for the at least one operating condition to determine whether the effective amount of EGR gas was administered into the combustion engine.

17. A method of operating an internal combustion engine, comprising:
receiving, at a controller, a signal from at least one knock sensor coupled to a combustion engine, wherein the combustion engine is coupled to an exhaust gas recirculation (EGR) system;
determining, via the controller, a value of at least one operating condition from the signal;
estimating, via the controller, an amount of EGR gas in the combustion engine based at least on the value of the at least one operating condition; and
generating, via the controller, a control signal for adjusting a position of an EGR valve of the EGR system to regulate an EGR flow rate based on the estimated amount of EGR gas in the combustion engine.

18. The method of claim 17, comprising comparing, via the controller, an estimated amount of EGR gas in the combustion engine to an expected amount of EGR gas in the combustion engine to determine whether an effective amount of EGR gas was administered into the combustion engine.

19. The method of claim 18, comprising comparing, via the controller, the value for the at least one operating condition to an expected value for the at least one operating condition to determine whether the effective amount of EGR gas was administered into the combustion engine.

* * * * *